Sept. 8, 1931.  L. S. WILLIAMS  1,822,513
WEIGHING SCALE
Filed Nov. 23, 1928
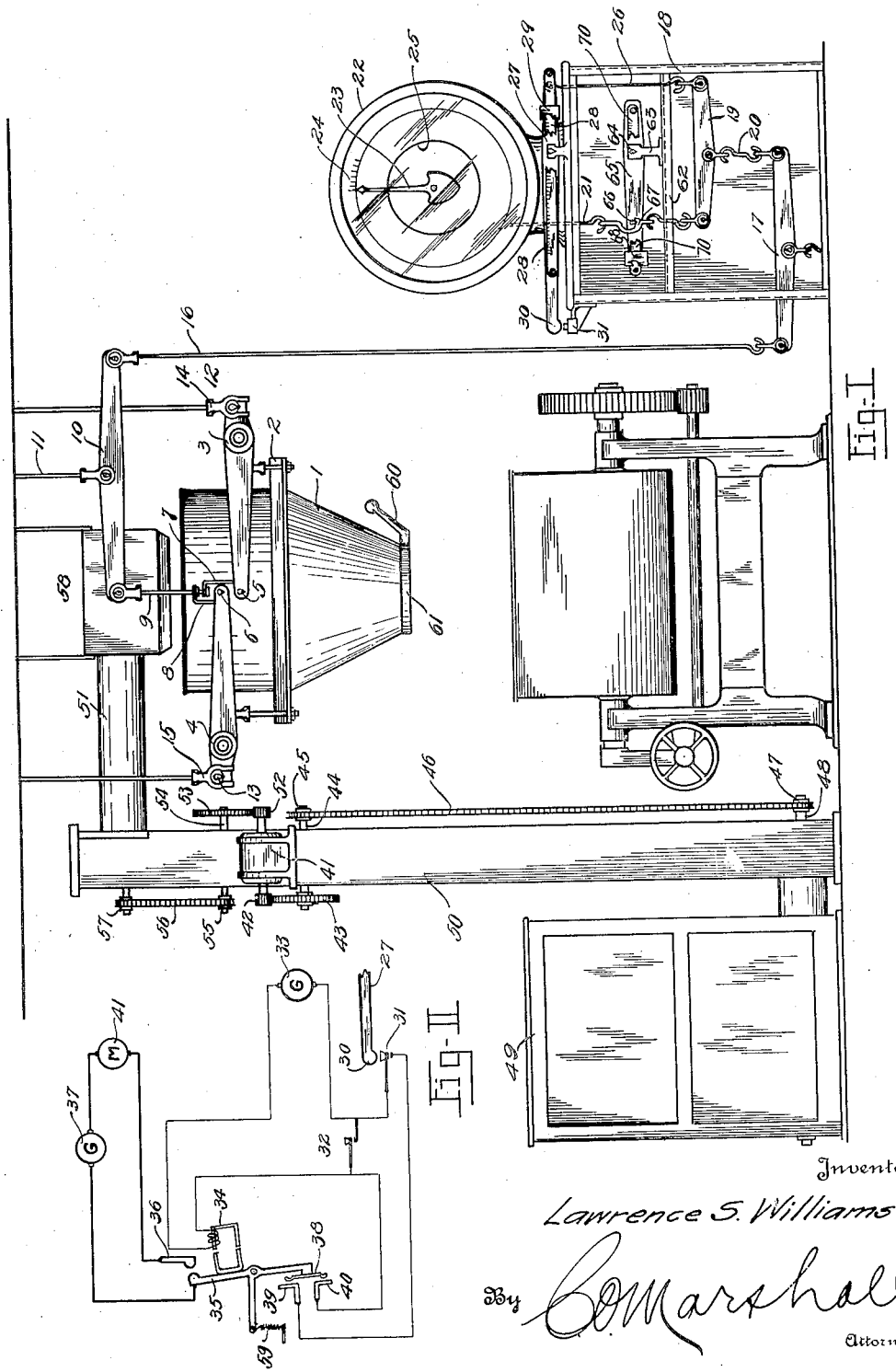
Inventor
Lawrence S. Williams
By C. O. Marshall,
Attorney Patented Sept. 8, 1931

1,822,513

UNITED STATES PATENT OFFICE

LAWRENCE S. WILLIAMS, OF TOLEDO, OHIO, ASSIGNOR TO TOLEDO SCALE COMPANY, OF TOLEDO, OHIO, A CORPORATION OF NEW JERSEY

WEIGHING SCALE

Application filed November 23, 1928. Serial No. 321,319.

This invention relates to weighing scales, and in particular to hopper scales which automatically determine the required amount of material, such as are used in bakeries and flour mills.

One of the principal objects of the invention is a scale which automatically "cuts off" the flow of the material when the predetermined amount has been deposited in the hopper and which also indicates on a chart the amount of the material in the hopper.

Another object is the provision of improved means which automatically stops the material feeding mechanism.

Another object is the provision of a scale wherein the weight indication is independent of the load determining mechanism.

Other objects and advantages will be apparent from the following description, in which reference is had to the accompanying drawings illustrating a preferred embodment of my invention and wherein similiar reference numerals designate similiar parts throughout the several views.

In the drawings:—

Figure I is a front elevational view of a weighing scale having parts broken away and showing the operative relation of the scale with the material feeding mechanism.

Figure II is a diagram of the remote control and main power circuits.

Referring to the drawings in detail, my invention as embodied therein consists of the hopper 1 which is supported by the frame 2 on the load pivots (not shown) of the pipe levers 3 and 4. Their nose pivots 5 and 6 engage the stirrups 7 and 8 provided on the lower end of a short connecting rod 9. The upper end of this connecting rod pivotally engages one end of an extension lever 10. This extension lever is pivotally suspended from the ceiling or a frame provided for this purpose by a fulcrum member 11. The fulcrum pivots 12 and 13 of the pipe levers 3 and 4 rest in the stirrups 14 and 15, which are suspended from the ceiling or an overhead frame. The other end of the extension lever 10 pivotally engages a long connecting rod 16 which transmits the "pull" of the load to the counterbalancing mechanism. A transmission lever 17, to which the long connecting rod 16 is attached, is fulcrumed in the cabinet 18. The location of the fulcrum of the lever 17 can be varied so as to obtain any required ratio. An equalizing lever 19 is connected to the lever 17 by the shackle 20. One end of the lever is directly connected by the connection 21 to a load-counterbalancing or offsetting mechanism. This counterbalancing mechanism is substantially as described in Patent No. 1,543,768 to Hem. This counterbalancing mechanism is supported within the substantially watch-case-shaped housing 22 and serves to offset the load. The indicator 23, which is driven by the counterbalancing mechanism, co-operates with the indicia 24 printed or etched on a stationary chart 25 which visually indicates the weight of the material in the hopper 1.

The other end of the equalizing lever 19 is connected by the connecting rod 26 to the "cut-off" operating lever 27 fulcrumed on the cabinet 18. A beam 28, provided with a poise 29, serves to determine the required amount of material. The poise 29, when moved to the indicium on the beam representing the desired weight of the material, causes the lever to overbalance and the lever nose 30 to rest against the electric switch 31, closing the electric circuit (see Figure II) which forms the remote control for the power circuit which operates the feeding and sifting mechanism with which the scale embodying the invention is used.

Assuming that it is desired to weigh out 300 pounds of flour. The poise 29 is moved toward the left to the 300-pound mark on the beam. The overbalanced lever closes the switch 31. The operator then presses the push-button switch 32 which is shunted across the remaining break in the circuit. The circuit so formed, receiving its energy from the source 33, energizes the puller-magnet 34. This causes the main switch member 35 to contact the member 36 and close the main power circuit, which receives its energy from the source 37. Simultaneously, the "keeper" 38 at the lower end of the member 35 closes the control circuit by contacting the switch members 39 and 40. As this action is instantaneous, the momentary pressure on the push-button starts the motor 41, and the operator is free to perform any other duties which he may have. The motor 41, acting through the pinion 42, the gear 43, shaft 44 and the sprocket 45 which is fixed on the opposite end of the shaft 44, drives the chain 46. The chain 46 engages the sprocket 47 mounted at the end of the shaft of a screw conveyor 48. The screw conveyor 48, located in the bottom of the flour bin 49, feeds the therein contained flour to a bucket elevator situated in the elevator housing 50. This bucket elevator, which is driven by the motor 41 through suitable gearing, delivers the flour to a screw conveyor which is housed in the duct 51. This screw conveyor is also driven by the motor 41, through its pinion 52 and a gear 53 which is fixed on a shaft 54 and meshes with the pinion. On the other end thereof is a pinion 55, which drives the pinion 57 which is fixed on the shaft of the screw conveyor housed in the duct 51. The flour is thus delivered to the sifter 58, where it is sifted and aerated and whence it drops into the hopper 1 suspended from the load levers 3 and 4 of the scale embodying the invention.

When 300 pounds of flour has accumulated in the hopper 1 its weight counterbalances the weight moment of the poise 29 on the beam 28. The nose 30 of the lever 27, to which the beam and poise are attached, is raised from its rest on the spring switch 31, thus breaking the remote control circuit, de-energizing the puller-magnet 34. This allows the spring 59, which is attached to an arm of the main switch member 35, to draw this member back and thus break the current flow in the power circuit, stopping the motor 41 and the feeding and elevating mechanisms driven thereby. The delivery of material to the hopper ceases. The operator then pulls the handle 60 on the hopper gate 61, which allows the material to flow from the hopper into the dough-mixer placed below to receive it.

The "cut-off" scales of the beam type as heretofore used have a serious defect. The flour or other material occasionally "bridges" when the hopper is discharged, with the result that a portion of this wedged material remains in the hopper. The operator is ignorant of this, as the overbalanced beam is actuated only by the total predetermined load. Also, when scales of this type are used for packing flour or other comminuted material in bags it has been the practice to check-weigh the bags on another scale. My invention obviates this additional work and expense. When these scales are used in bakeries for mixing dough, in the event that some of the material is retained in the hopper the batch will not have the right proportion of ingredients, the finished product will not be up to standard and financial losses and loss of professional prestige will result.

In the scale embodying my invention the amount of material in the hopper is at all times visually indicated on the chart 25. The operator is assured that the proper amount has been delivered, and upon discharge of the material the return of the indicator to the zero position assures him that the hopper has been completely emptied.

As flour, dust and grain accumulate on the rim of the hopper, the frame, the levers and other exposed movable parts of the scale, provision is made to counterbalance the effect of this accumulation. Located within the cabinet 18 is a shelf 62, and fixed thereon is the fulcrum stand 63. The fulcrum pivot 64 of the lever 65 rests on suitable bearings (not shown) provided in the fulcrum stand 63. The power pivot 66 of the lever 65 engages a bearing member 67 located in the connection 21. A poise 68 slidably mounted on the beam 70 is adapted to offset the weight of the accumulation.

It will readily be seen that the scale is well adapted to weigh any pulverized or comminuted materials or grain for batch-mixing, packing in bags or other containers.

The embodiment of my invention herein shown and described is to be regarded as illustrative only and it is understood that the invention is susceptible to variation, modification and change within the spirit and scope of the subjoined claims.

Having described my invention, I claim:

1. In a scale of the type described, in combination, lever mechanism, a commodity-receiver supported thereby, means for supplying said commodity-receiver, a cut-off for said supply means, automatic weighing and load indicating mechanism operatively connected to said lever mechanism, and means connected to said lever mechanism independently of said weighing and indicating mechanism for controlling said cut-off.

2. In a scale of the type described, in combination, lever mechanism, a commodity-receiver supported thereby, means for supplying said commodity-receiver, an electrically controlled cut-off for said supply means, automatic weighing and load indicating mechanism operatively connected to said lever mechanism, and means connected to said lever mechanism independently of said weighing and indicating mechanism for controlling said cut-off.

3. In a scale of the type described, in combination, lever mechanism, a commodity-receiver supported thereby, means for supplying said commodity-receiver, an electrically controlled cut-off for said supply means, automatic weighing and load indicating mechanism operatively connected to said lever mechanism, and means independent of said weighing and indicating mechanism for controlling said cut-off, said electrical control having a plurality of switches.

4. In a scale of the type described, in combination, lever mechanism, a commodity-receiver supported thereby, means for supplying said commodity-receiver, electrically controlled cut-off means for said supply means, automatic weighing and load indicating mechanism operatively connected to said lever mechanism, and means independent of said weighing and indicating mechanism for controlling said cut-off, said electrical control having a manually operated switch and a switch operated by said independent control means.

5. In a scale of the type described, in combination, lever mechanism, a commodity-receiver supported thereby, means for supplying said commodity-receiver, cut-off means for said supply means, automatic weighing and load indicating mechanism operatively connected to said lever mechanism, and means independent of said weighing and indicating mechanism connected to said cut-off means and the said lever mechanism for determining the amount of the load.

6. In a scale of the type described, in combination, lever mechanism, a commodity-receiver supported thereby, means for supplying said commodity-receiver, cut-off means for said supply means, automatic weighing and load indicating mechanism operatively connected to said lever mechanism, and means independent of said weighing and indicating mechanism connected to said cut-off means and to said lever mechanism for determining the amount of the load, said means comprising a pivotally supported lever and variable load-offsetting means including a poise.

7. In a scale of the type described, in combination, lever mechanism, a commodity-receiver supported thereby, means for supplying said commodity-receiver, cut-off means for said supply means, automatic weighing and load indicating mechanism operatively connected to said lever mechanism, means independent of said weighing and indicating mechanism connected to said cut-off means and to said lever mechanism to determine the amount of the load, and means for operatively connecting said independent load-controlling means and said weighing and indicating mechanism.

8. In a scale of the type described, in combination, lever mechanism, a commodity-receiver supported thereby, means for supplying said commodity-receiver, cut-off means for said supply means, automatic weighing and load indicating mechanism operatively connected to said lever mechanism, means independent of said weighing and indicating mechanism connected to said cut-off means and to said lever mechanism to determine the amount of the load, means for operatively connecting said independent load-controlling means and said weighing and indicating mechanism, and auxiliary load-offsetting means for taring out increments of load.

9. In a scale of the type described, in combination, lever mechanism, a load hopper supported thereby, means for conveying comminuted material to said load hopper, means for stopping the conveyance of said material, pendulum load counterbalancing means and indicating means operatively connected to said lever mechanism, said indicating means including a relatively movable chart and index, means independent of said weighing and indicating mechanism for determining the amount of the load and controlling the conveyance of said material, auxiliary load-offsetting means for taring out increments of the load, and means for operatively connecting said independent load-controlling means, said auxiliary load-offsetting means and said weighing and indicating means.

LAWRENCE S. WILLIAMS.